United States Patent [19]

Taglione et al.

[11] Patent Number: 5,774,247

[45] Date of Patent: Jun. 30, 1998

[54] OPTICAL SIGNAL TRANSCEIVER FOR USE WITH DIFFUSELY TRANSMITTED OPTICAL RADIATION

[75] Inventors: John V. Taglione, Scarborough; Maurus Cappa, Willowdale, both of Canada

[73] Assignee: International Business Machines Corporation, Armonk, N.Y.

[21] Appl. No.: 708,863

[22] Filed: Sep. 4, 1996

[30] Foreign Application Priority Data

Dec. 28, 1995 [CA] Canada .................................... 2166256

[51] Int. Cl.⁶ .................................................. H04B 10/00
[52] U.S. Cl. ........................... 359/152; 359/172; 359/169
[58] Field of Search .................................... 359/152, 143, 359/172, 159, 169–170, 113; 455/151.2; 370/310, 277

[56] References Cited

U.S. PATENT DOCUMENTS

| | | | |
|---|---|---|---|
| 4,358,858 | 11/1982 | Tamura et al. | 359/152 |
| 5,267,070 | 11/1993 | Stewart et al. | 359/152 |
| 5,390,040 | 2/1995 | Mayaux | 359/152 |
| 5,416,624 | 5/1995 | Karstenseu | 359/152 |

*Primary Examiner*—Kinfe-Michael Negash
*Attorney, Agent, or Firm*—John D. Flynn

[57] ABSTRACT

An optical signal data transceiver comprises a convex mirror to direct received optical signals onto at least one detector responsive to corresponding optical wavelengths. At least one optical emitter is arranged to irradiate the convex mirror such that the emitted optical radiation is reflected from the convex mirror in a diffuse manner. The specific shape of the convex mirror is selected to obtain a desired transmission and reception specificity and suitable shapes include, as non limiting examples, segments of spheres, hemispheres, paraboloids of revolution, right cones, etc.

17 Claims, 5 Drawing Sheets

OPTICAL SIGNAL TRANSCEIVER FOR USE WITH DIFFUSELY TRANSMITTED OPTICAL RADIATION

FIELD OF THE INVENTION

The present invention relates to optical data transceivers. More specifically, the present invention relates to optical data transceivers which transmit with diffuse optical radiation transmission patterns and/or receive diffuse or directed optical radiation.

BACKGROUND OF THE INVENTION

Optical data transceivers are well known. For example, IBM sells infrared (IR) data transceivers, under the name IBM Infrared Wirelss LAN, which provide wireless connections between personal computers and local area networks. Some such systems employ directed IR transmissions between devices to increase range and/or reduce power requirements. Unfortunately, such systems are susceptible to having their communications interrupted or inhibited by the line of sight path between devices being blocked by an obstruction.

To avoid such problems, other optical data transceivers operate with the optical signals being transmitted diffusely. However, existing transceiver systems which employ diffuse optical radiation patterns have experienced difficulty in covering relatively large areas, especially when a transceiver is used to communicate with a battery operated computer system, such as a laptop, which has a limited power budget and thus may broadcast at a low power level. While such data transceivers may be equipped with lens systems such as a "fisheye" lens to mitigate such problems by gathering an increased proportion of the transmitted signal, such lens systems are generally prohibitively expensive for common usage.

SUMMARY OF THE INVENTION

It is an object of the present invention to provide a novel optical signal data transceiver which obviates or mitigates at least one of the disadvantages of prior art.

According to a first aspect of the present invention, there is provided an optical signal data transceiver, comprising: a convex mirror to reflect said optical signals; t least one optical signal emitter positioned relative to said convex mirror such that said mirror diffusely reflects signals emitted by said at least one emitter; at least one optical detector positioned relative to said convex mirror such that at least a portion of received optical signals impinging on said convex mirror are reflected to said optical detector.

According to another aspect of the present invention, there is provided an optical data transceiver, comprising: a housing including at least a portion of which is substantially transparent to a selected range of optical radiation wavelengths; a mirror positioned within said housing, said mirror in the form of a convex surface which is reflective to said selected range of optical radiation wavelengths; at least one emitter of optical radiation in said selected range of optical radiation wavelengths, said at least one emitter being located in said housing and located relative to said mirror such that optical radiation emitted by said emitter irradiates at least a portion of the reflective surface of said mirror such that said emitted optical radiation is reflected through said at least one portion of said housing; and at least one detector of optical radiation in said selected range of optical wavelengths, said at least one detector being located in said housing and located relative to said mirror such that optical radiation entering said housing through said at least one portion is reflected onto said at least one detector.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
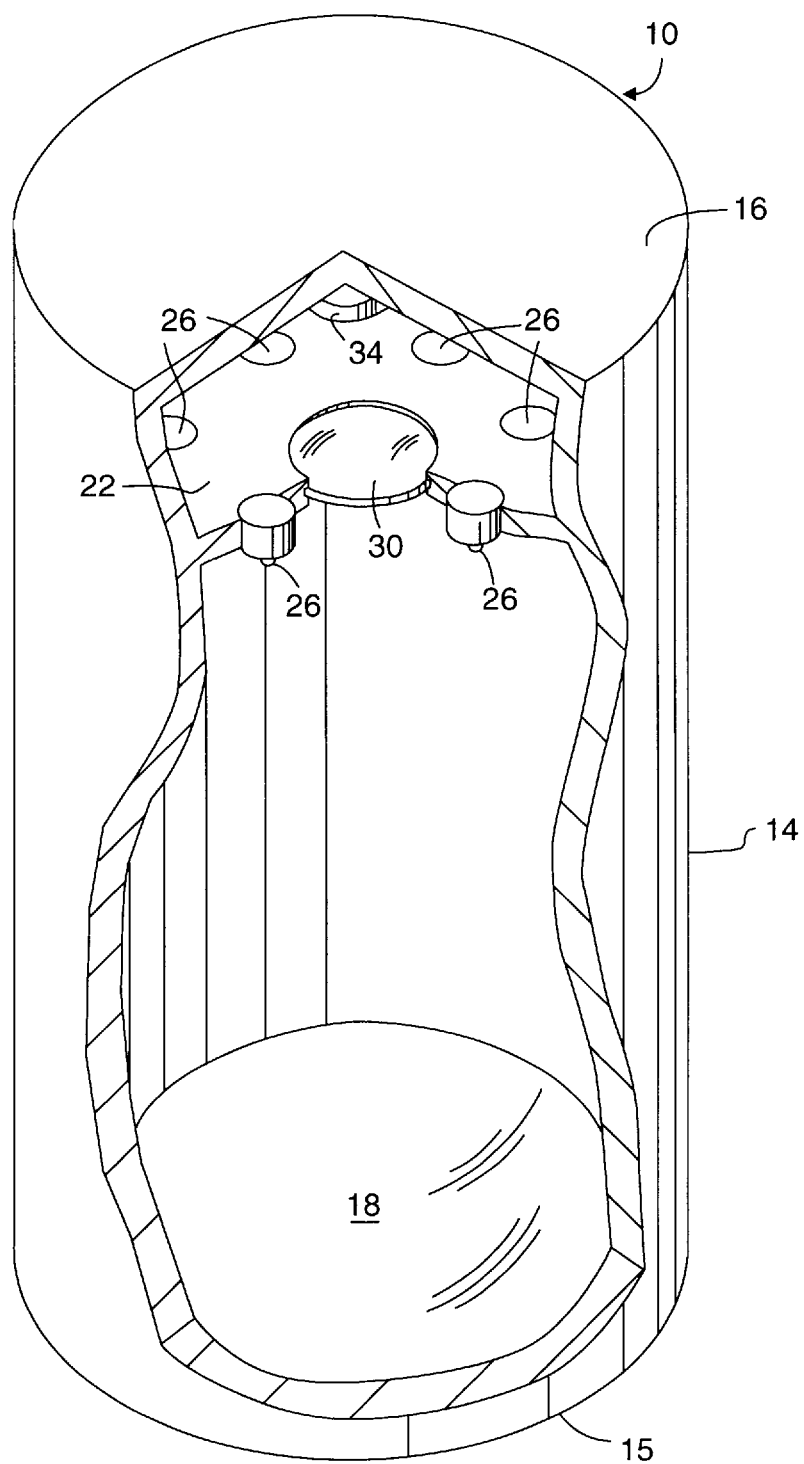
FIG. 1 shows a perspective, partially cut-away view of an optical data transceiver in accordance with the present invention.

An optical data transceiver in accordance with the present invention is indicated generally at 10 in FIG. 1. The transceiver includes a generally cylindrical housing 14, a convex mirror 18 adjacent one end 15 of housing 14, a support plate 22 which supports at least one optical signal emitter 26 and a lens 30, and an optical detector 34 adjacent the other end 16 of housing 14.

Housing 14 is fabricated such that at least the portions of the walls adjacent convex mirror 18 are transparent to the optical wavelengths which are intended to be employed for transmitting and receiving data with transceiver 10. In the following discussion, the use of near band and/or medium band (850 nm to 1500 nm) infrared optical signals will be discussed. However, it will be understood by those of skill in the art that the present invention is not limited to the use of these infrared wavelengths and any suitable visible or non-visible optical wavelength can be employed as desired.

In a preferred embodiment, housing 14 is formed from a hollow Lexan® cylinder which is transparent to near band and medium band infrared and each end of the cylinder is closed with a cap of a suitable material. It will be apparent to those of skill in the art that housing 14 need not be a cylinder, and other configurations such as housings which are octagonal in cross section, etc. may be employed as desired. It will also be apparent to those of skill in the art that it is not required that housing 14 be closed, although this is preferred to prevent the ingress of dust or other foreign objects into transceiver 10.

Figure 2:
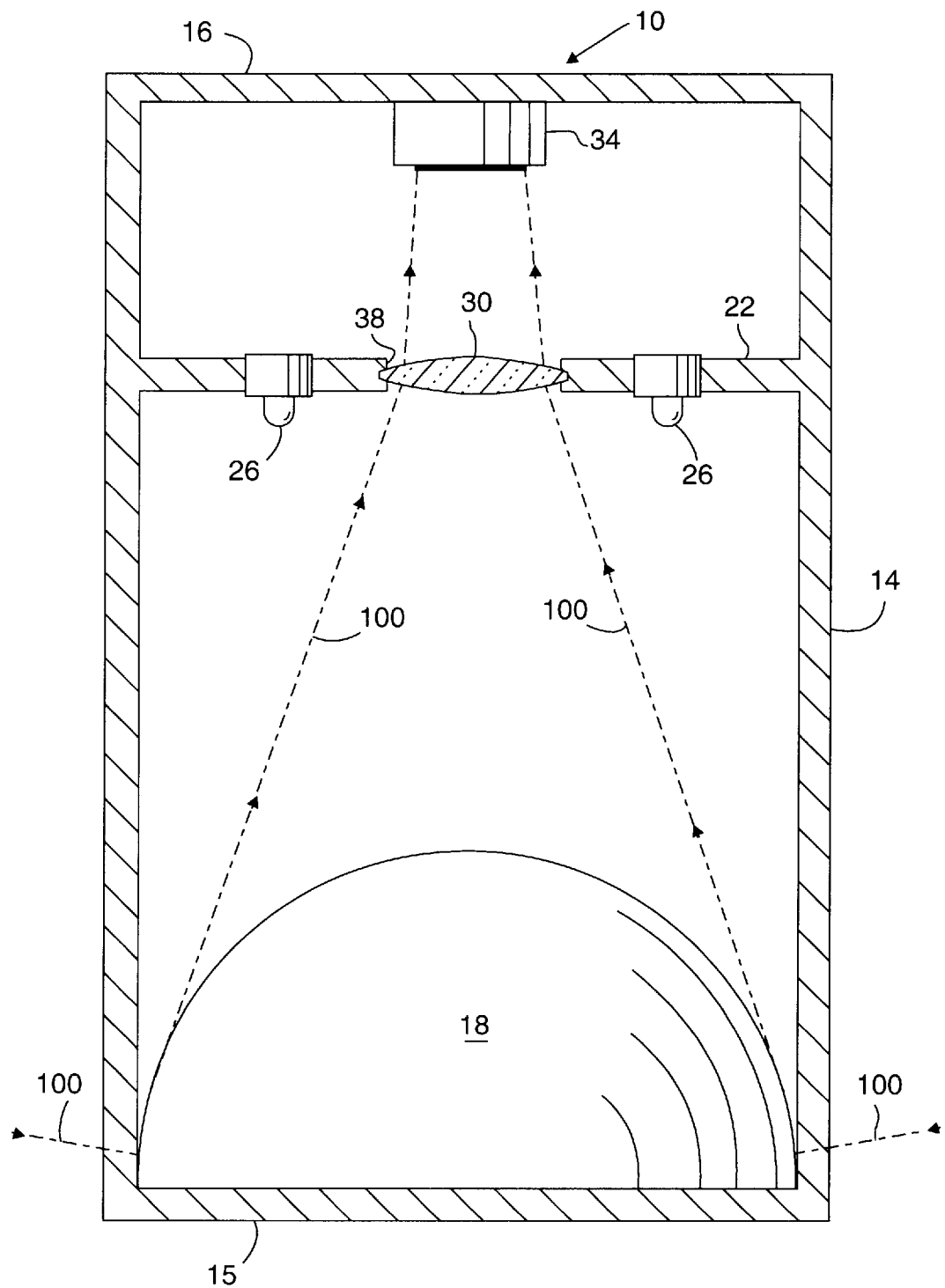
FIG. 2 shows a side section of the optical data transceiver of FIG. 1 when receiving data transmissions.
Figure 3:
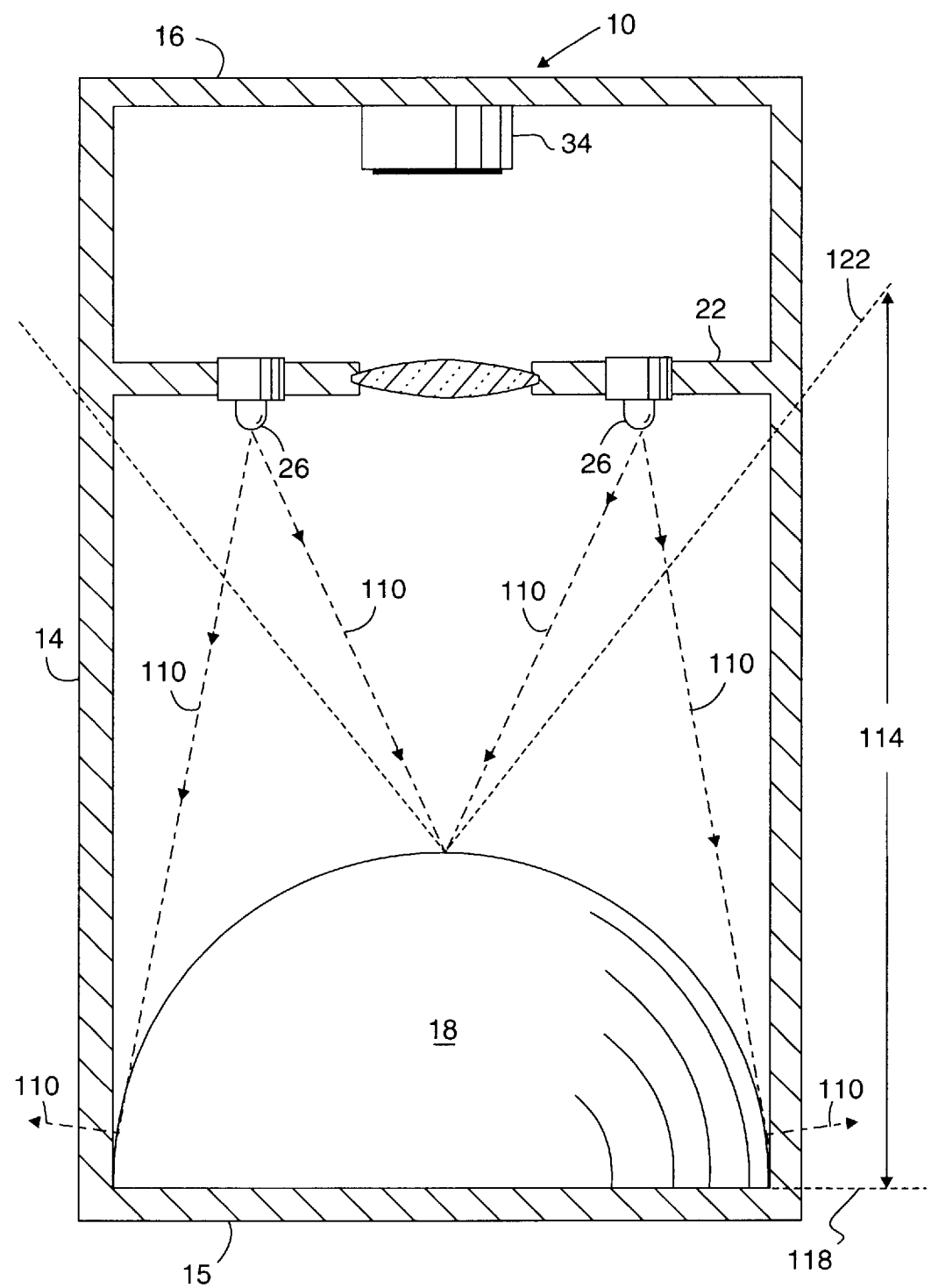
FIG. 3 shows a side section of the optical data transceiver of FIG. 1 when transmitting data.

Convex mirror 18, best seen in FIGS. 2 and 3, is fabricated in any suitable manner provided that it reflects the optical wavelengths in use, as described below. In this embodiment, convex mirror 18 is in the form of a segment of a sphere. More specifically, in the embodiment of FIGS. 2 and 3, convex mirror 18 is a hemisphere, although a lesser portion of a sphere may be employed to alter the resulting reflection pattern, if desired.

An array of optical emitters 26 are arranged in a circular manner on support 22 facing convex mirror 18. Optical emitters 26 can be any suitable device, such as an infrared LED or Laser diode, and any suitable number from one to ten or more may be included in the array, although a minimum of three emitters 26 is preferred when emitters 26 are LED-based infrared emitters. The actual number of emitters employed will depend upon the total desired output power for optical signal transmissions and upon the optical emission pattern of the particular emitters 26.

In the embodiment shown in the Figures, six emitters 26 have been employed to provide the desired output power and to provide substantially complete irradiation of the reflecting surface of convex mirror 18 by emitters 26. In this manner, a diffuse transmission signal is obtained, as will be described below with reference to FIG. 3. As will be apparent to those of skill in the art, when six emitters 26 are employed, each emitter can irradiate approximately a 60 degree portion of convex mirror 18. Similarly, when three emitters are employed, each emitter can irradiate approximately a 120 degree portion of convex mirror 18.

Depending upon the irradiation pattern of the emitters, they can alternatively be arranged to provide an overlapping irradiation between adjacent emitters. For example, if six emitters are employed which have a relatively wide irradiation pattern, they can be arranged to each irradiate a 120 degree portion of convex mirror 18, each emitter's 120 degree portion overlapping the two adjacent emitters' 120 degree portions by 60 degrees.

It is also contemplated that two or more arrays of emitters 26 can also be employed, wherein each array of emitters 26 operates in a different range of optical wavelengths. For example, a first array of emitters (not shown) may emit near band IR while a second array of emitters (not shown) may emit medium band IR.

At the center of the support 22 is an aperture 38 in which lens 30 is mounted. Lens 30 can be any lens suitable for gathering optical radiation reflected from convex mirror 18 and directing it onto detector 34. In a preferred embodiment, lens 30 is a plano convex lens with a focal length selected such that the optical radiation gathered from convex mirror 18 is directed onto detector 34. Detector 34 can be any detector suitable for the optical radiation wavelengths employed with transceiver 10, as would occur to one of skill in the art.

It should be noted that, as lens 30 is intended to concentrate optical radiation onto detector 34 and is not used for imaging purposes, it need not be an optical instrument quality lens. Thus less expensive, general purpose lenses may be employed. It is also contemplated that, in some circumstances, wherein relatively high power optical signals are employed, lens 30 may not be required. In such a case, lens 30 may be omitted and aperture 38 will be left open.

It is also contemplated that, if different ranges of optical wavelengths are employed, two or more detectors (not shown) may be employed, each of which is responsive to a respective range of optical wavelengths.

The circuitry (not shown) for the electronic functions associated with transceiver 10, such as the modulator and demodulator circuits, amplifiers, etc., can be located in any appropriate location with respect to detector 34 and emitters 26 as would occur to those of skill in the art. For example, such circuitry can be placed in the cavity formed between support 22 and end 16 provided that a clear optical path is provided between aperture 38 and detector 34. Alternatively, the circuitry may be placed in a suitable enclosure and located on top of end 16.

FIG. 2 shows the operation of transceiver 10 in receiving mode. As can be seen in the Figure, optical radiation 100 which is transmitted from other data signal transceivers, either through diffuse or directed transmission, and which impinges on convex mirror 18 is reflected towards detector 34 and/or lens 30. As will be apparent to those of skill in the art, radiation 100 which has been transmitted diffusely, and that which has been transmitted via directed transmission and which has undergone some scattering and/or divergence, will impinge convex mirror 18 at a variety of locations and angles which will be reflected by convex mirror 18 towards detector 34. By directing a relatively large proportion of the impinging optical radiation 100 to detector 34, the reception sensitivity of transceiver 10 is improved. If lens 30 is present, the additional step of gathering the reflected radiation and thereby focusing an increased proportion of it onto detector 34 further increases reception sensitivity.

FIG. 3 shows transceiver 10 in transmission mode wherein emitters 26 emit optical radiation 110 onto convex mirror 18 which diffusely reflects radiation 110. As indicated by the dashed lines in FIG. 3, with proper placement of emitters 26 such that substantially the entire reflecting surface of convex mirror 18 is irradiated, optical radiation 110 is reflected through a vertical range 114 which extends from a plane 118, which is approximately horizontal, to a point 122 after which it is obscured by support 22. Depending upon the dimensions of housing 14, for example the distance between support 22 and convex mirror 18, and the shape of convex mirror 18, as described below, vertical range 114 can to a large degree be selected as required.

Also, providing emitters 26 are properly placed, for example substantially equi-spaced about the perimeter of convex mirror 18, optical radiation 110 is reflected through a full 360 degree horizontal circle about transceiver 10. As will be apparent to those of skill in the art, proper placement of emitters 26 will depend upon their emission patterns and their distance from convex mirror 18 and can be determined through conventional design techniques. Generally, proper placement of emitters 26 will result in substantially all of the surface reflecting of convex mirror 18 being irradiated by optical radiation emitted by emitters 26. In an ideal configuration, which is not necessary for operation of transceiver 10 but which is desirable, the reflecting surface of convex mirror 18 is substantially evenly irradiated by emitters 26.

Figure 4:
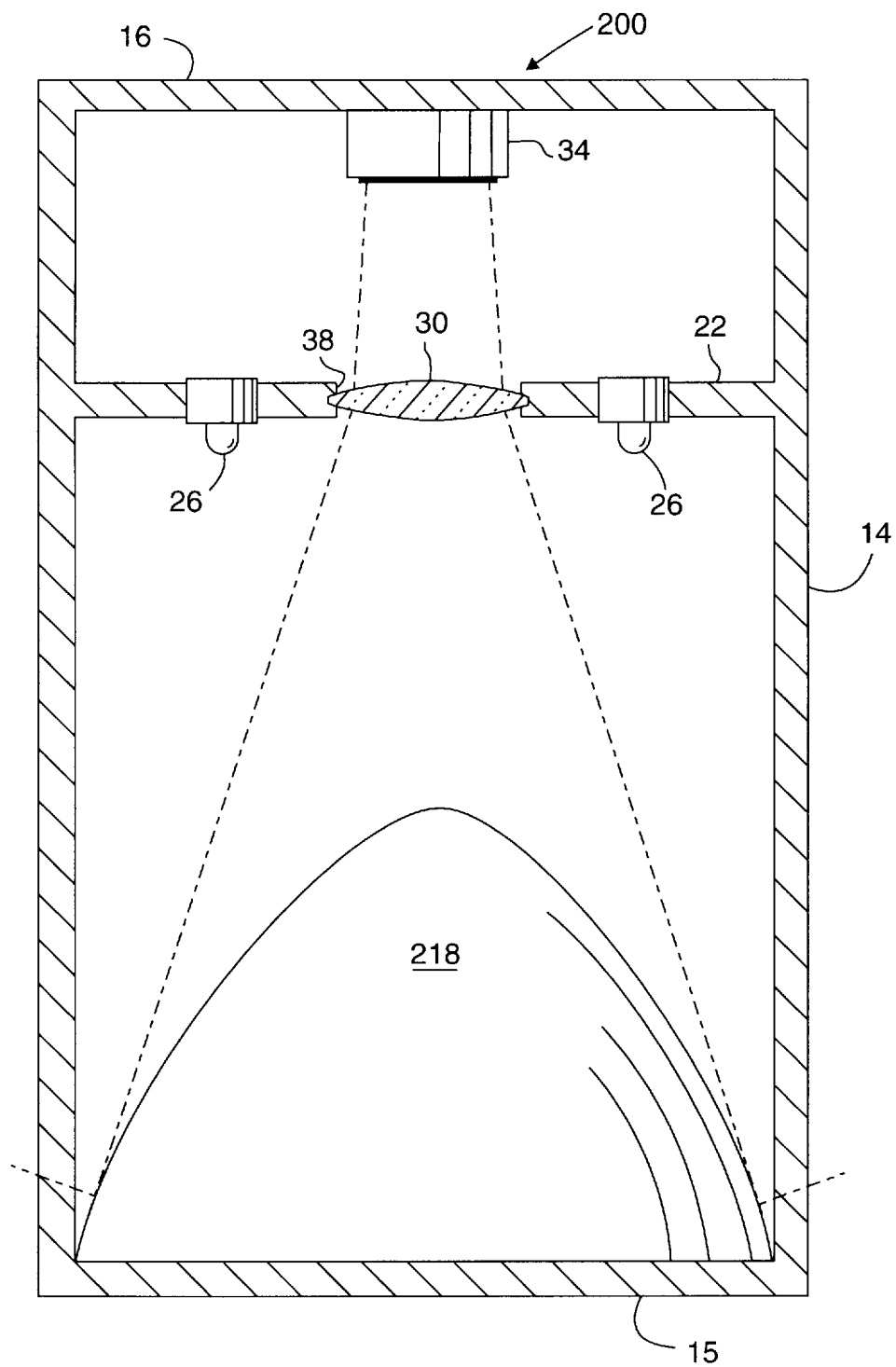
FIG. 4 shows a side section of another embodiment of an optical data transceiver in accordance with the present invention when receiving data transmissions.
Figure 5:
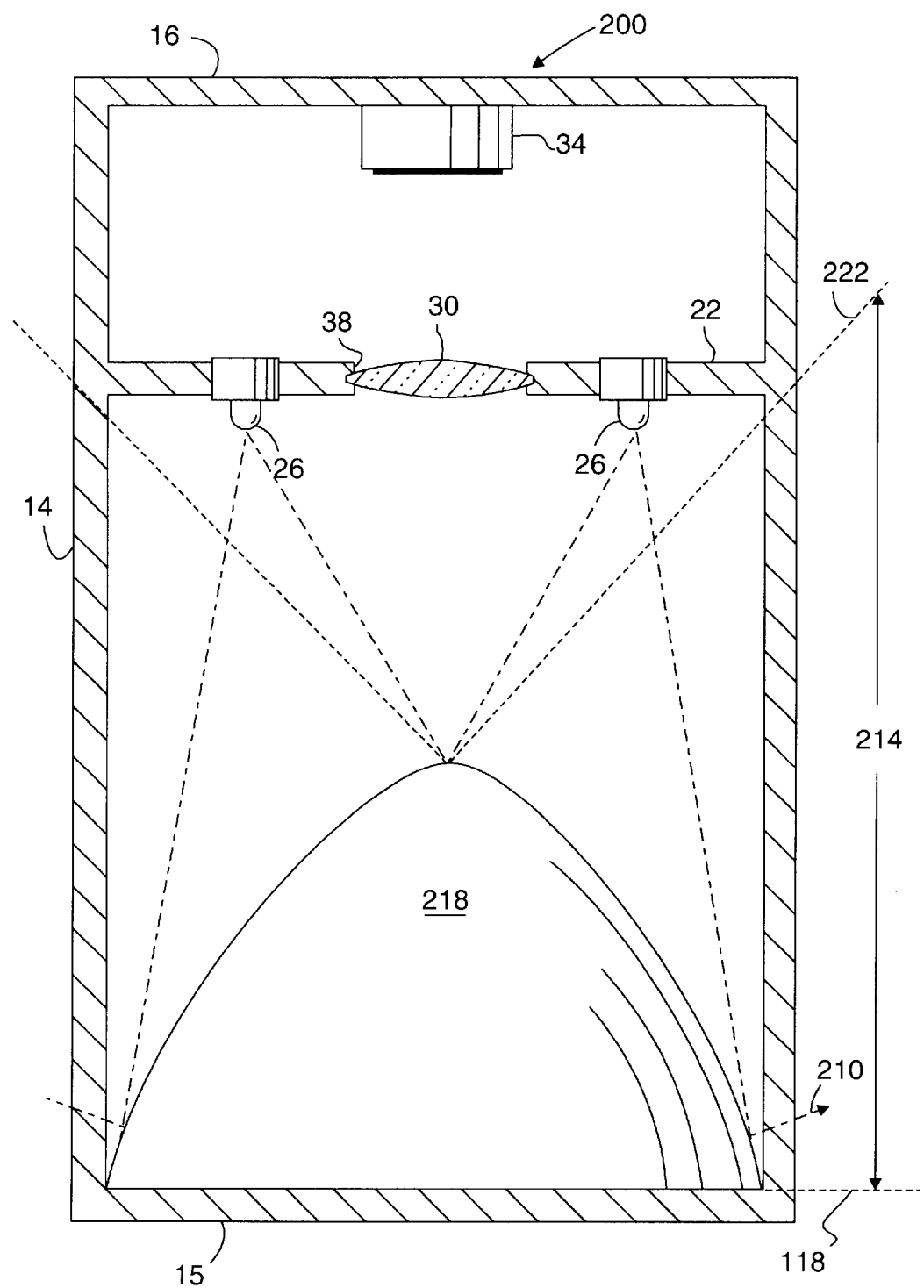
FIG. 5 shows a side section of the optical data transceiver of FIG. 4 when transmitting data.

In another embodiment of the present invention shown in FIGS. 4 and 5, wherein like components to those shown in FIGS. 1 through 3 are identified with like reference numerals, convex mirror 218 is in the form of a paraboloid of revolution. As before, convex mirror 218 can be formed in any suitable manner as long as it provides a surface of the desired shape that will reflect optical radiation of the wavelengths intended for use with transceiver 10.

As shown in FIG. 5, wherein transceiver 200 is transmitting, the parabolic shape of convex mirror 218 has been selected to diffuse a greater proportion of optical radiation 210 horizontally (i.e.—perpendicular to the sensing surface of detector 34), reducing vertical range 214.

In receiving mode, as shown in FIG. 4, the parabolic shape of convex mirror 218 reflects a larger proportion of the optical radiation which impinges convex mirror 218 horizontally, or substantially horizontally (i.e.—perpendicular to the sensing surface of detector 34), than that which impinges convex mirror 218 from other orientations.

It is contemplated that transceiver 200 will be preferred in circumstances wherein a large proportion of communications to and from transceiver 200 will be via optical radiation with substantially horizontal transmission paths. Of course, other suitable shapes for convex mirror 18, such a right cone for even greater horizontal specificity, or a segment of an oblate spheroid for greater vertical specificity, etc. will occur to those of skill in the art, the shapes being selected to suit the anticipated optical transmission paths.

The above-described embodiments of the invention are intended to be examples of the present invention and alterations and modifications may be effected thereto, by those of skill in the art, without departing from the scope of the invention which is defined solely by the claims appended hereto.

What is claimed is:

1. An optical signal data transceiver, comprising:
    a convex mirror having a reflecting surface for reflecting optical signals;
    a plurality of optical signal emitters positioned relative to said convex mirror such that optical signals emitted by said plurality of emitters irradiates substantially all of the reflecting surface of the mirror causing said optical signals to be diffusely reflected by the mirror;
    at least one optical detector positioned relative to said convex mirror such that at least a portion of received optical signals impinging on said convex mirror are reflected to said optical detector.

2. An optical signal data transceiver according to claim 1 wherein said convex mirror is in the shape of a segment of a sphere.

3. An optical signal data transceiver according to claim 2 wherein said convex mirror is a hemisphere.

4. An optical signal data transceiver according to claim 1 wherein said convex mirror is in the shape of a paraboloid of revolution.

5. An optical signal data transceiver according to claim 1 further comprising a lens to concentrate said signals impinging on said convex mirror on to said optical detector.

6. An optical signal data transceiver according to claim 1 including at least three optical signal emitters equi-spaced about a plane positioned relative said convex mirror such that the signals emitted by each of said at least three optical emitters is diffused by said mirror to radiate over at least 120 degrees of a 360 degree horizon parallel to said plane.

7. An optical signal data transceiver according to claim 6 including six optical signal emitters, the signals emitted by each of said six optical emitters being diffused by said mirror to radiate over at least 120 degrees of a 360 degree horizon parallel to said plane, the 120 degree radiation pattern of each emitter overlapping the 120 degree radiation pattern of at least two other emitters.

8. An optical signal data transceiver according to claim 1 wherein said optical signals are infrared signals.

9. An optical signal data transceiver according to claim 8 wherein the wavelength of said infrared signals is in the range of from about 850 nm to about 1500 nm.

10. An optical signal data transceiver according to claim 8 further comprising a cylindrical housing of infrared transparent material, said plurality of optical emitters and said at least one optical detector being positioned adjacent one end of said cylinder and said convex mirror being positioned adjacent the other and wherein said diffuse optical signals traverse the walls of said cylinder.

11. An optical data transceiver, comprising:
    a housing including at least a portion of which is substantially transparent to a selected range of optical radiation wavelengths;
    a mirror positioned within said housing, said mirror in the form of a convex surface which is reflective to said selected range of optical radiation wavelengths;
    a plurality of emitters of optical radiation in said selected range of optical radiation wavelengths, said plurality of emitters being located in said housing and located relative to said mirror such that optical radiation emitted by said plurality of emitters irradiates substantially all of the reflective convex surface of the mirror causing said optical radiation to be diffusely reflected by the mirror through said at least one portion of said housing; and
    at least one detector of optical radiation in said selected range of optical wavelengths, said at least one detector being located in said housing and located relative to said mirror such that optical radiation entering said housing through said at least one portion is reflected onto said at least one detector.

12. An optical data transceiver according to claim 11 wherein said convex mirror is in the shape of a segment of a sphere.

13. An optical data transceiver according to claim 12 wherein said convex mirror is a hemisphere.

14. An optical data transceiver according to claim 11 wherein said convex mirror is in the shape of paraboloid of revolution.

15. An optical data transceiver according to claim 11 further including a lens to gather optical radiation entering said housing after it is reflected from said convex mirror and to direct said gathered optical radiation onto said detector.

16. An optical data transceiver according to claim 11 comprising at least two emitters of optical radiation, each said emitter emitting optical radiation in a different selected range of wavelengths.

17. An optical data transceiver according to claim 16 comprising at least two optical radiation detectors each of which is responsive to a different one of said two selected ranges of wavelengths.

* * * * *